United States Patent [19]
Lechevin

[11] 4,155,039
[45] May 15, 1979

[54] TWO-WAY TRANSMISSION SYSTEM BETWEEN A MAIN STATION AND SECONDARY STATIONS

[75] Inventor: René Lechevin, Paris, France

[73] Assignee: Thomson-CSF, Paris, France

[21] Appl. No.: 827,111

[22] Filed: Aug. 23, 1977

[30] Foreign Application Priority Data

Aug. 26, 1976 [FR] France .................................. 76 25801

[51] Int. Cl.² ............................................. H04B 1/50
[52] U.S. Cl. ...................................... 325/20; 343/176
[58] Field of Search .................... 179/15 FD, 15 FS; 343/176, 179, 181; 325/4, 17, 18, 20, 23, 24, 49, 50, 63

[56] References Cited

U.S. PATENT DOCUMENTS

| 3,363,180 | 1/1968 | Geissler | 325/4 |
| 3,546,386 | 12/1968 | Darcey | 179/15 FS |
| 3,925,729 | 12/1975 | Amoroso | 343/179 |

*Primary Examiner*—Benedict V. Safourek
*Attorney, Agent, or Firm*—Cushman, Darby & Cushman

[57] ABSTRACT

Each station comprises a cavity oscillator microwave transmitter/receiver employed both as transmitter and local oscillator, each secondary station being characterized by the value of its own intermediate frequency. The main station separately receives each of the intermediate frequencies and is modulated by a multiplexed signal formed by the information intended for each of the secondary stations.

5 Claims, 4 Drawing Figures

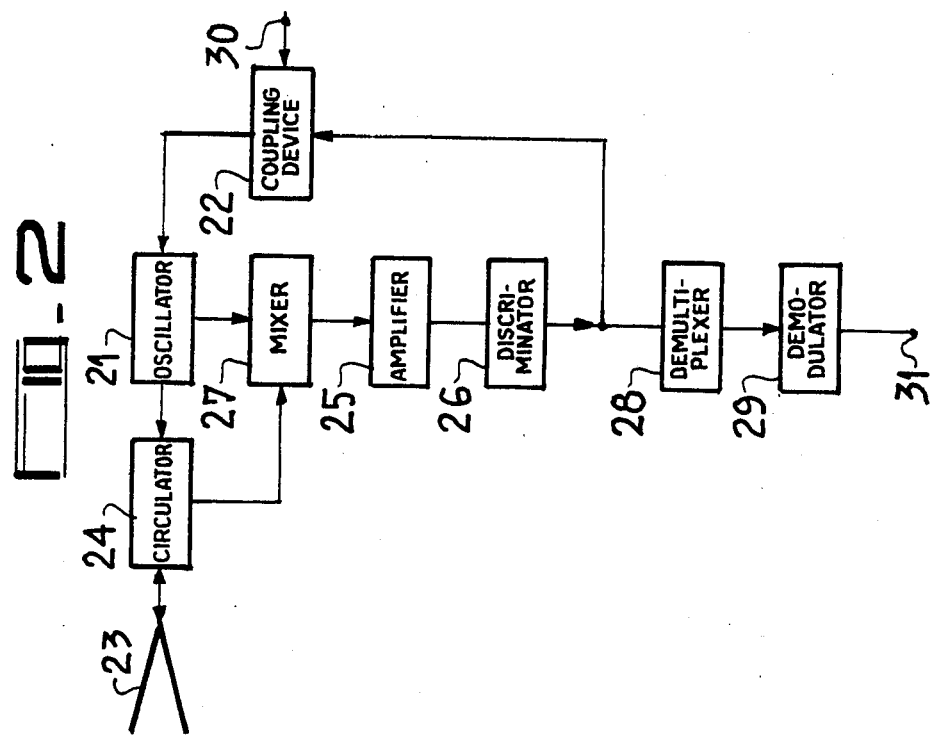
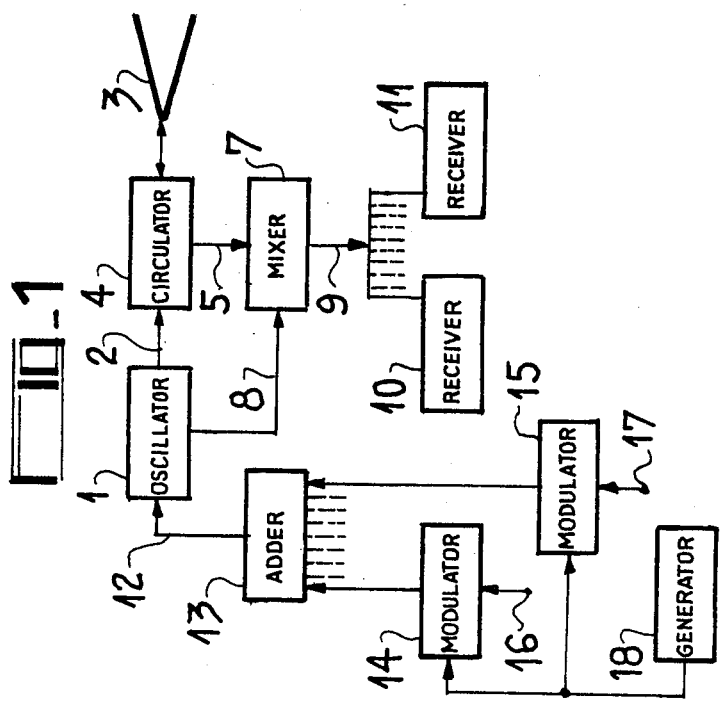

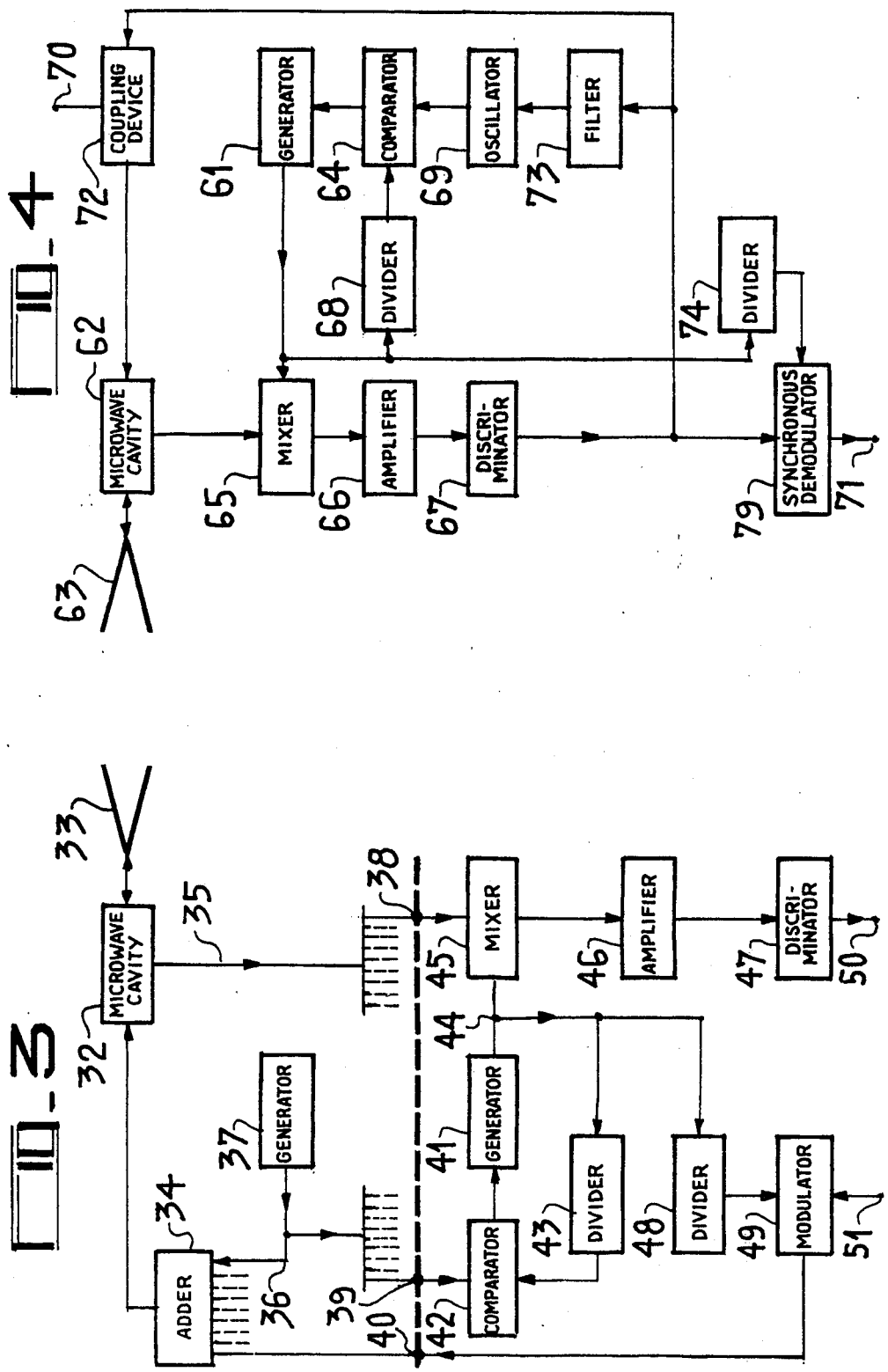

TWO-WAY TRANSMISSION SYSTEM BETWEEN A MAIN STATION AND SECONDARY STATIONS

The present invention relates to two-way radio links between a main station and n secondary stations distributed about the former.

Links of this kind are frequently required either to form an independent local network between a nodal point and individual user locations or as a terminal structure in regional or national telecommunications networks, where the links to be established become single-channel in nature.

These short links (they are generally less than 10 km) of low traffic capacity (for example a single telephony channel) are rarely created in the form of conventional radio links because their establishment involves high costs and the multiplication of such links would create insoluble problems as far as frequency planning is concerned. These links are therefore generally established through cables.

However, these latter also suffer major drawbacks: they are fragile, have to be protected (from vehicular traffic for example) and in particular are unsuited to semi-permanent connection.

The object of the present invention is to overcome these various drawbacks by utilizing the properties of very short waves in order to build a simple, low-cost radio installation.

According to the invention, there is provided a two-way transmission system between a main station, and each one of n secondary stations having respective different nominal transmission frequencies, n being a positive integer, each station comprising: an input mixer having an output, and a modulated microwave oscillator, operating both as transmitter oscillator and receiver oscillator and having a modulation input; said main station having a single nominal transmission frequency, and comprising a set of n channel circuits including n intermediate frequency receivers, having respective center frequencies $F_1, F_2 \ldots F_n$, coupled in parallel to said input mixer output, and an multiplexer device having an output coupled to said modulation input and n inputs for respectively receiving n distinct information signals intended respectively for each of said n secondary stations; and each of said n secondary stations comprising: an intermediate frequency receiver whose centre frequency is tuned respectively to $F_1, F_2 \ldots F_n$, a channel circuit comprising a demultiplexer device for extracting one of said n information signals, and a coupling device having: an output coupled to said modulation input, a first input for receiving an information signal intended for said main station and a second input for receiving from said receiver a control signal for controlling said microwave oscillator so that the center frequency of the output signal from said mixer is equal to said center frequency.

The invention will be better understood and others of its features rendered apparent from a consideration of the ensuing description and the related drawings in which:

FIG. 1 is the circuit diagram of the main station in a transmission system in accordance with the invention;

FIG. 2 is the circuit diagram of a secondary station in the same transmission system;

FIG. 3 is a preferred embodiment of the station shown in FIG. 1;

FIG. 4 is a preferred embodiment of the secondary station shown in FIG. 2.

In FIG. 1, a microwave oscillator 1 has its main output 2 connected to an aerial 3 through two ports of a circulator 4 of which a third port 5 is connected to a first input of a mixer 7 whose second input 8 is supplied with part of the signal furnished by the oscillator 1. The output 9 of the mixer 7 provides a parallel supply to eight intermediate frequency receivers only the first 10 and the eighth 11 of which have been shown. The oscillator 1 is frequency modulated by the signal which it receives at its input 12 from an adder 13 whose eight inputs are respectively connected to the output of eight modulators only those 14 and 15 of which have been shown. A generator 18 supplies with eight respective simultaneous and different carrier frequencies, these modulators, in particular the modulators 14 and 15, receiving at their inputs 16 and 17 respective different pieces of information.

In the example described, these pieces of information are the speech signals produced by different telephone users.

The generator 18 supplies a different carrier frequency to each modulator which modulates the carrier by the speech signals which are to be transmitted, using a suppressed-carrier double sideband modulation technique.

The eight carrier frequencies, for example 162.5–175 ... 250 kHz, having an uniform spacing of 12.5 kHz, are applied to the adder 13 in order to form a frequency multiplex; let 162.5 kHz be the frequency assigned to the modulator 14 and 250 kHz that assigned to the modulator 15. The multiplexed signals frequency modulate the oscillator 1 whose nominal rest frequency is $F_o$, for example 50 GHz. This modulation can for example be performed using a varicap diode.

This same oscillator 1 is used for intermediate frequency transposition in the mixer 7, of the signals received by the serial 3 from secondary stations, these signals numbering eight and being uniformly distributed for example in a range extending from 50,015.9 to 50,018.7 MHz with which there corresponds, for each of the eight receivers such as those 10 and 11, one of the eight respective, nominal, intermediate frequencies 15.9–16.3 ... 18.7 MHz.

These receivers are of conventional frequency modulation type and demodulate the corresponding speech signals.

The following figure illustrates the circuit diagram of one of the eight secondary stations in communication with the main station described hereinbefore.

In FIG. 2, the elements 21, 23, 24 and 27 are identical to the respective elements, 1, 3, 4 and 7 of FIG. 1 and are identically connected. The mixer 27 supplies in series a selective amplifier 25 and a discriminator 26 connected on the one hand to a demodulator 29, through a demultiplexer 28, and on the other hand to the oscillator 21 through a coupling device 22 supplied at its input 30 with the information for transmission, the information for reception appearing at the output 31 of the modulator 29.

The operation of this system is as follows:

The amplifier 25 and the discriminator 26 are tuned to a nominal center frequency equal to one of the eight intermediate frequencies of the main station, for example 15.9 MHz, and have a bandwidth limited to the minimum bandwidth value required for correct transmission of the modulated signals being handled.

This intermediate frequency which is characteristic of the secondary station in question, also represents the frequency interval which the oscillator 21 must maintain between its center frequency and the received frequency, this with the help of a feedback loop closed through the device 22. The latter includes a low-pass filter which generates from the output signal supplied by the discriminator 26, the requisite correcting voltage applied to the oscillator 21 at the same time as the speech signals amplified in the same device 22. The latter likewise comprises a conventional search device, which, on application of voltage or after a break, instigates frequency sweep by the oscillator 21 in order to enable the feedback loop to lock in. There corresponds with the intermediate frequency of 15.9 MHz, the selection by the demultiplexer 28 of the carrier frequency 162.5 KHz demodulated by the synchronous demodulator 29 which reconstitutes at its output 31 the speech signals assigned to this station.

Thus, each secondary station only recognises the channel assigned to it and, at the main station, the reception of each secondary station is assigned to a separate channel.

Each secondary station has one and the same correspondant, i.e., the main station, so that it is of interest that the secondary stations should have an aerial with the best possible directional characteristics. On the other hand, the main station should possess an aerial whose coverage extends to the whole of the sector in which the secondary stations are located. In the limiting case, this sector could extend to 360° and the radiation pattern of the aerial would then have to be omnidirectional.

The choice of frequency modulation as the type of modulation to use in the microwave oscillators, is not an exclusive one. It has been resorted to in the present example because of its simplicity and the quality of its linearity which is better than that attainable with amplitude modulation.

The same applies to the choice of the kind of modulation used in respect of the carrier frequencies of the main station, and frequency modulation or single side band modulation can be employed without any difficulty.

In either case this choice in no way restricts the scope of the invention.

It will be observed that the use of the transmitter oscillator as local oscillator involves no mixing between the transmitted and received information since the modulation spectrum in totally different in each direction of transmission.

In a variant embodiment, the assembly of oscillator-circulator-mixer (references 1, 4, 7 in FIG. 1 or 21, 24 and 27 in FIG. 2) could advantageously be substituted by a single microwave cavity equipped with a modulable oscillator diode, also doing duty as mixer and connected for example directly to the aerial.

This variant is used for example in a preferred embodiment of the invention described hereinafter.

In FIG. 3, a microwave cavity 32 equipped in the manner described earlier and connected to an aerial 33, is supplied with modulating signals from an adder 34 and furnishes intermediate frequency signals at its output 35. One of the inputs 36 of the adder 34 is supplied with the output signal from a reference generator 37 operating at a nominal frequency of 100 KHz.

The assembly of the above elements covers the general elements of the preferred embodiment of the main station of the system. The mode of operation and the frequency plan are identical to those of the corresponding elements of the main station already described, with the exception of the reference signal incorporated into the modulating signals, whose function will be explained hereinafter.

This main station, like the former one, is intended to communicate with eight secondary stations.

The figure only shows the channel circuit corresponding to the first of the eight stations. This circuit is supplied at its inputs 38 and 39 respectively with the intermediate frequency and reference signals, and at its output 40 furnishes a modulated carrier frequency characteristic of said first channel.

This circuit comprises a high frequency signal generator 41 controlled, by the phase comparator 42, to oscillate at a multiple n of the reference frequency, this through the agency of an n-times frequency divider 43 supplied with the signal appearing at the output 44 of the generator 41 and itself supplying one of the inputs of the comparator 42 whose other input is supplied with the reference frequency.

The output signal from the generator 41 also supplies the heterodyne frequency to a mixer 45 which effects transposition to a second intermediate frequency, identical for all the channels and equal to the standard value of 10.7 MHz, of the intermediate carrier frequency corresponding to the channel in question. This intermediate frequency is filtered and amplified in the device 46 then demodulated in the discriminator 47 which supplies at its output 50 the corresponding received information.

The generator 41 also supplies a frequency divider 48 which carries out frequency division by 32 and furnishes to the modulator 49 a carrier which the latter modulates by the information for transmission applied to the terminal 51, the modulated signal appearing at the output 40.

$FI_i$ being the center frequency of an arbitrary intermediate frequency signal measured in MHz (and where $i = 1, 2 \ldots 8$), $0.1n$ the frequency of the oscillator 41 and $P_i$ the frequency furnished by the divider 48, a beat direction in the mixer 45 being chosen such that $FI_i - 0.1n = 10.7$, and bearing in mind that $P_i = 0.1n/32$, then:

$$FI_i - 32P_i = 10.7 \tag{1}$$

this expressing the necessary and constant relationship between $FI_i$ and $P_i$, whatever the value of n.

The value chosen by way of example in the description of FIG. 1 would therefore be obtained for the following values of n:

| | | |
|---|---|---|
| $FI_1 = 15.9$ | $P_1 = 0.1625$ | for n = 52 |
| $FI_2 = 16.3$ | $P_2 = 0.175$ | for n = 56 |
| $FI_8 = 18.7$ | $P_8 = 0.250$ | for n = 80 |

The expression (1) above, would, of course, have to be satisfied by the secondary stations and that corresponding to the first channel is described hereinafter:

In FIG. 4, the aerial 63 and the coupling device 72 are respectively identical to the elements 23 and 22 in FIG. 2. Similarly, the elements 61, 64, 65, 66, 67, 68 and 74 are respectively identical to those 41, 42, 45, 46, 47, 43 and 48 of FIG. 3 and operate at the same frequencies corresponding to the first channel, 70 being the input for the information for transmission and 71 the input for the information received at the main station, through a sunchronous demodulator 79.

The microwave cavity 62 is identical to that 32 of FIG. 3 but its center transmission frequency is equal to $F_o + FI_1$ instead of $F_o$, that is to say to 50,015.9 MHz in the example chosen here, being controlled to this frequency by means of a loop incorporating the discriminator 67 and the device 72 and operating in the same fashion as that employing the corresponding identical elements of FIG. 2.

The generator 61, like its counterpart 41 of FIG. 3, is adjusted to the nominal frequency $n \times 0.1 = 5.2$ MHz and controlled accurately at this value by the feedback loop incorporating the divider 68 (this having a division factor of 52 in the example chosen) and the comparator 64 receiving the reference frequencies from an oscillator 69 which latter nominally operates at 100 KHz and is synchronised by the reference frequency received from the main station through the discriminator 67 and a band-pass filter 73.

This preferred embodiment of the system in accordance with the invention has the additional advantage that the specific parts of the stations, main or secondary, are identical, in particular all the selective intermediate frequency amplifiers 46 and 66 as well as the discriminators 47 and 67 being tuned to the standard value of 10.7 MHz.

Each channel is differentiated solely by the programming of the n-times dividers 43 and 68 if the band-width of the generators 41 and 61 is adequate.

Moreover, the transmission of a reference frequency makes it possible to control the transposition frequencies of the secondary stations in accordance with that of the main station so that it is possible to limit the pass band of the filters to the values strictly required and, in order to effect demodulation of the amplitude-modulated signals, with carrier suppression, to provide synchronous signals which require nothing other than controlling in phase in the manner well known per se in the technique of synchronous demodulation.

The applications have been described in respect of eight channels. This number, quite obviously, is a matter of arbitrary choice although the preferred application is to a limited number of secondary stations.

The invention can be applied to a system comprising a large number of secondary stations by using the concentrator technique well known from telephony systems. In this application, the n channels are constituted by one special channel known as the semaphore channel and n-1 commonised channels. To do this, the n-times dividers of the secondary stations are arranged to be remote-controlled from the main station by information carried in the semaphore channel. In the rest state, all the secondary stations are aligned with the semaphore channel.

Of course, the invention is not limited to the embodiments described and shown which were given solely by way of example.

What is claimed is:

1. A two-way transmission system between a main station, and each one of n secondary stations having respective different nominal transmission frequencies, n being a positive integer greater than one, each main and secondary station comprising: an aerial, an input mixer having an output, and first and second inputs, and a modulated microwave oscillator, operating both as transmitter oscillator and receiver oscillator and having a modulation input and first and second outputs, said mixer input and said first output of said oscillator being coupled to said aerial and said second input of said mixer being coupled to said oscillator output; said main station having a single nominal transmission frequency, and comprising a set of n channel circuits including n intermediate frequency receivers, having respective center frequencies $F_1, F_2 \ldots F_n$, coupled in parallel to said input mixer output, and a multiplexer device having an output coupled to said modulation input and n inputs for respectively receiving n distinct information signals intended respectively for each of said n secondary stations; and each of said n secondary stations comprising: an intermediate frequency receiver whose center frequency is tuned respectively to $F_1, F_2 \ldots F_n$, a channel circuit comprising a demultiplexer device for extracting one of said n information signals, and a coupling device having: an output coupled to said modulation input, a first input for receiving an information signal intended for said main station and a second input for receiving from said receiver a control signal for controlling said microwave oscillator so that the center frequency of the output signal from said mixer is equal to said centre frequency.

2. A transmission system as claimed in claim 1, wherein said mixer and said oscillator in each station are constituted by one and the same microwave cavity incorporating a semi-conductor element, said single cavity being directly connected to a transmitter/receiver aerial.

3. A transmission system as claimed in claim 1, wherein said multiplexer device comprises: a generator for supplying n separate carrier frequencies, n modulators each having a first input for receiving one of said n separate carrier frequencies and a second input coupled to one of said n multiplexer device inputs, and an adder for adding the output signals from said modulators, said adder having an output coupled to said multiplexer device output.

4. A transmission system as claimed in claim 3, wherein each of said n modulators modulates one of said carrier frequencies by suppressed-carrier double side band amplitude modulation, said microwave oscillator being frequency modulated and said demultiplexer device comprising a synchronous demodulator.

5. A transmission system as claimed in claim 4, wherein said main station furthermore comprises a reference frequency generator, said multiplexer device comprising an additional input for receiving the output signals from said reference generator; and wherein each of said n channel circuits of said main station and of said channel circuit of each of said n secondary stations, comprises a high frequency signal generator controlled to a frequency equal to one of the n multiples of said reference frequency, each receiver of said main and said n secondary stations comprising a further mixer for converting said intermediate frequency to an additional, fixed intermediate frequency, said carrier frequency generator being constituted by n dividers respectively supplied by each of said n signal generators, and the channel circuit of each secondary station comprising a further divider for dividing the frequency of the signal from its carrier frequency generator, the signal output of said further divider of each secondary station being coupled to its synchronous demodulator.

* * * * *